United States Patent
Kolhouse et al.

(10) Patent No.: US 9,636,997 B2
(45) Date of Patent: May 2, 2017

(54) SYSTEM, METHODS, AND APPARATUS FOR ENGINE COOLING SYSTEM MANAGEMENT

(71) Applicant: Cummins Inc., Columbus, IN (US)

(72) Inventors: J. Steven Kolhouse, Columbus, IN (US); Vivek Anand Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 249 days.

(21) Appl. No.: 14/294,862

(22) Filed: Jun. 3, 2014

(65) Prior Publication Data

US 2015/0343892 A1    Dec. 3, 2015

(51) Int. Cl.
*B60K 11/00* (2006.01)
*B60K 11/08* (2006.01)
*F01P 7/12* (2006.01)

(52) U.S. Cl.
CPC ............. *B60K 11/085* (2013.01); *F01P 7/12* (2013.01); *F01P 2025/13* (2013.01)

(58) Field of Classification Search
CPC ......... B60K 11/00; B60K 11/02; B60K 11/04; B60K 11/08
See application file for complete search history.

(56) References Cited

U.S. PATENT DOCUMENTS

| | | |
|---|---|---|
| 1,660,146 A | 2/1926 | Winans |
| RE27,632 E | 5/1973 | Plackett |
| 7,347,168 B2 | 3/2008 | Reckels et al. |
| 7,424,868 B2 * | 9/2008 | Reckels ................. F01P 7/167 123/41.1 |
| 8,443,921 B2 * | 5/2013 | Charnesky ................. F01P 7/08 180/68.1 |

* cited by examiner

*Primary Examiner* — John Walters
*Assistant Examiner* — James Triggs
(74) *Attorney, Agent, or Firm* — Taft Stettinius & Hollister LLP

(57) ABSTRACT

System, apparatus, and methods are disclosed for opening one or more louvers of an engine cooling system to provide an airflow to the radiator to reduce a radiator fan on time.

30 Claims, 3 Drawing Sheets

SYSTEM, METHODS, AND APPARATUS FOR ENGINE COOLING SYSTEM MANAGEMENT

GOVERNMENT RIGHTS

The present invention was made with Government assistance from the U.S. Department of Energy (DOE) under contract No. DE-EE0003403. The U.S. Federal Government may have certain rights therein.

FIELD OF THE INVENTION

The present application generally relates to engine cooling systems, and more particularly to controlling airflow louvers for a radiator in engine cooling systems to reduce and/or avoid fuel consumption penalties associated with operation of the radiator fan.

BACKGROUND

For engine cooling systems, a radiator fan, for pulling additional air through the radiator to provide cooling of the coolant, will typically activate when engine coolant temperatures reach a maximum temperature threshold to pull additional air through the radiator to remove heat from the coolant. Overall fuel economy may be impacted by the amount of time the radiator fan is active. Therefore, a need remains for further improvements in systems, apparatus, and methods for controlling radiator louvers to improve fuel economy.

SUMMARY

Unique systems, methods, and apparatus are disclosed to control radiator louvers in an engine cooling system for improved fuel economy. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
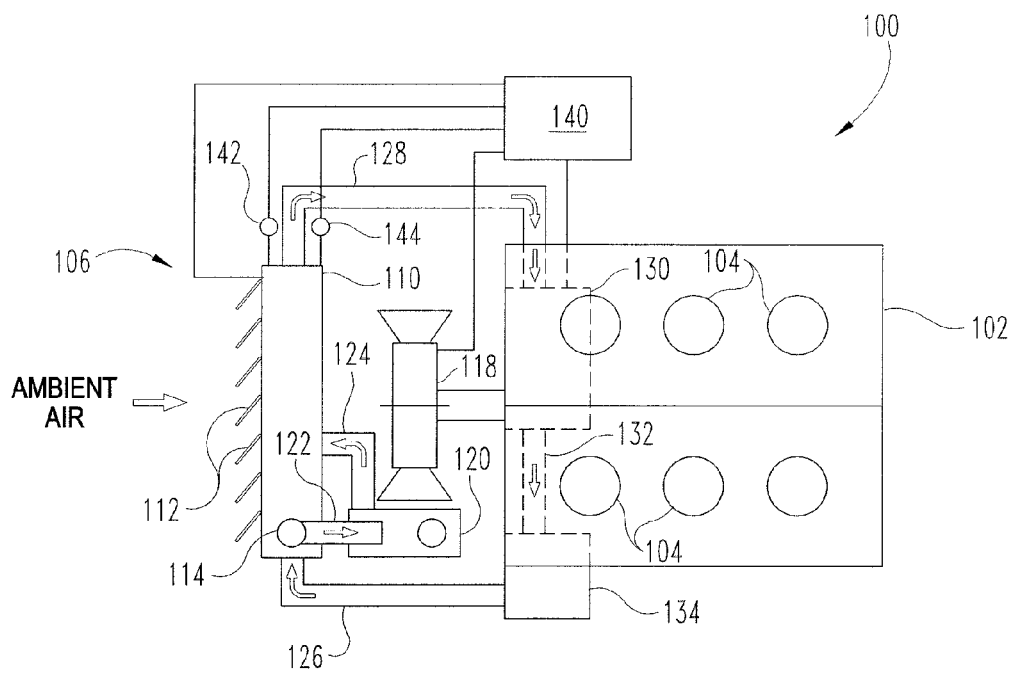
FIG. 1 is a schematic illustration of a system including an engine and an engine cooling system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a vehicle system 100 that includes an engine 102, such as an internal combustion engine, in fluid communication with an engine cooling system 106 for circulating a coolant into and out of the engine 102. Engine 102 includes a number of cylinders 104 forming combustion chambers into which fuel is injected by fuel injectors to combust with the charge air that has entered through an intake manifold (not shown).

The engine cooling system 106 includes a radiator 110, a radiator fan 118, a coolant reservoir 120, a water pump 130, and a thermostat 134. The coolant is circulated by the water pump 130 through various plumbing arrangements (e.g., hoses, conduit, etc.) fluidly coupled to the engine cooling system components. In one embodiment, the water pump 130 circulates the coolant through the engine 102, where it generally passes around the cylinders 104 absorbing heat from the engine 102 before exiting the engine 102 via the thermostat 134. To preserve clarity of the illustrated embodiment, the plumbing arrangement for circulating the coolant through the engine 102 and around the cylinders 104 has been omitted.

A conduit 132 may be fluidly coupled to the water pump 130 and the thermostat 134 for conducting the flow of coolant between the water pump 130 and the thermostat 134. Under certain conditions, the thermostat 134 may be closed, blocking the flow of coolant from flowing to the plumbing outside the engine 102, returning the coolant to the water pump 130. For example, under a cold engine start condition, the thermostat 134 may block the flow of coolant until the engine 102 reaches an operating temperature threshold.

From the thermostat 134, the coolant flows to the radiator 110 through an upper hose 126 fluidly coupled between the thermostat 134 and the radiator 110. Under certain operating conditions, the radiator 110 exchanges the engine heat from coolant to ambient air circulated through the radiator 110 by the radiator fan 118. The radiator fan is typically only activated when the coolant temperature reaches and/or exceeds a maximum coolant temperature threshold. Generally, the radiator 110 is comprised of a series of tubes mounted in a parallel arrangement, with fins brazed to the tubes. The tubes are arranged to allow the coolant to flow through the tubes, while the fins conduct heat from the tubes. The heat conducted by the fins is exposed to the ambient air flowing through the radiator 110, thereby transferring the heat from the fins to the ambient air. It is contemplated that in certain embodiments the engine cooling system 106 may include more than one radiator, or heat exchanger. The coolant then flows from the radiator 110 back to the water pump 130 through a lower hose 128 fluidly coupled between the radiator 110 and the water pump 130.

The radiator 110 includes a radiator cap 114, which serves as a pressure release valve. As the coolant temperature increases, the coolant expands, building up pressure. Under certain conditions, a valve (not shown) in the radiator cap 114 opens, allowing coolant to flow from the radiator 110 through an overflow conduit 122 into coolant reservoir 120. For example, an increase in temperature of the coolant in the engine cooling system 106 typically causes the coolant to expand, resulting in an increase of pressure, causing the valve to open when the pressure is greater than a pressure threshold. When the temperature in the engine cooling system 106 cools and the pressure returns to a pressure below the pressure threshold, a vacuum is typically created, opening a valve (not shown) and reversing the flow of coolant from the coolant reservoir 120 back to the radiator 110 via a return conduit 124.

The radiator 110 further includes one or more radiator louvers 112. The radiator louvers 112 may be positioned (i.e. opened) to allow for ambient air to flow through the radiator 110, thereby allowing the activation of the radiator fan 118 to be delayed and/or negated altogether. It should be noted that not all of the radiator louvers 112 have been identified in the illustrated embodiment to preserve clarity of illustration. In certain embodiments, engine cooling system 106 may additionally include various engine cooling system components not shown, such as a heater core, a heater fan, a transmission cooler, and transmission cooling lines, to name a few examples.

The engine cooling system 106 further includes a controller 140 structured to perform certain operations, and/or to receive and interpret signals from any component and/or sensor of the engine cooling system 106, such as a temperature sensor 142 for sensing the temperature of the coolant in the radiator 110, or a mass air flow sensor 144 for sensing the air flow through radiator 110, for example. The controller 140 is operatively coupled with and structured to store instructions in memory which are readable and executable by controller 140 to operate engine cooling system 106 components, such as the radiator louvers 112, for example.

It shall be appreciated that the controller 140 may be provided in a variety of forms and configurations including one or more computing devices forming a whole or part of a processing subsystem having non-transitory memory storing computer executable instructions, processing, and communication hardware. The controller 140 may be a single device or a distributed device. The controller 140 may be in communication with any actuators, sensors, datalinks, computing devices, wireless connections, or other devices to be able to perform any operations described herein.

The controller 140 may include stored data values, constants, and functions, as well as operating instructions stored on computer readable medium. Any of the operations of exemplary procedures described herein may be performed at least partially by the controller 140. Other groupings that execute similar overall operations are understood within the scope of the present application. In certain embodiments, the controller 140 includes one or more modules structured to functionally execute the operations of the controller 140. Modules may be implemented in hardware and/or instructions stored on a non-transient computer readable medium, and modules may be distributed across various hardware or instructions stored on a non-transient computer readable medium. More specific descriptions of certain embodiments of controller operations are included in the section referencing FIG. 3 below. Operations illustrated are understood to be exemplary only, and operations may be combined or divided, and added or removed, as well as re-ordered in whole or in part, unless stated explicitly to the contrary herein.

Figure 2A:
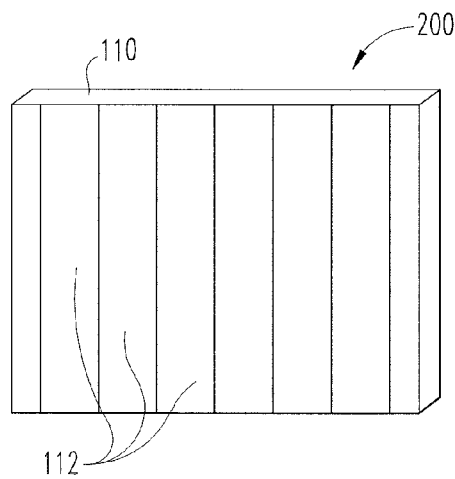
FIGS. 2A-2B are schematic illustrations of the radiator louvers of the engine cooling system of FIG. 1 in a closed state and an open state, respectively.
Figure 2B:
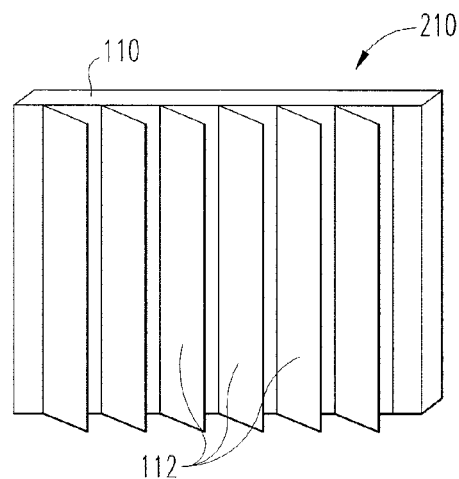

Referring now to FIGS. 2A-2B, there are illustrated embodiments of the radiator 110 with the radiator louvers 112 in a closed state, as illustrated in embodiment 200, and in an open state, as illustrated in embodiment 210. In one non-limiting embodiment, the open state indicates the radiator louvers 112 are open to a single predetermined open position, such as at a 90° angle from closed state (i.e. the radiator louvers 112 being at 0° in the closed state).

It is contemplated that in certain embodiments the open state may represent the radiator louvers 112 being in various degrees of open from the closed state. In certain non-limiting embodiments, the open state may include an additional parameter, such as an angle from closed parameter or a percentage between 0% (closed) and 100% (completely open), directing the radiator louvers 112 to change position from a closed state or a current open state to an open state corresponding to the angle or percentage opening from the closed parameter. In one non-limiting example, as the temperature of the coolant in the radiator 110 causes the pressure to exceed a threshold, the radiator louvers 112 may receive a first command to open to a first open state corresponding to a 45° angle from the closed position, enabling an ambient airflow through the radiator 110. Subsequently, as the temperature of the coolant in the radiator increases further, for example, the radiator louvers 112 may receive a second command to open to a second open state corresponding to a 90° angle from the closed position to further increase the flow of ambient air through the radiator 110.

It is further contemplated that in certain embodiments the open state may include an additional parameter, such as a louver reference corresponding to a particular louver, where each louver has been enumerated, directing one or more specific louvers to change position. In one non-limiting example to illustrate this embodiment, as the temperature of the coolant in the radiator 110 causes the pressure to exceed a threshold, the radiator louvers 112 may receive a command to open only a portion of the radiator louvers 112. For example, the command could direct only the odd portion of the radiator louvers 112 to open, only the left-most portion of the radiator louvers 112 to open, etc.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, by receiving a value by which the interpreted parameter can be calculated, and/or by referencing a default value that is interpreted to be the parameter value. Furthermore, it is contemplated that the term sensor as used herein may include a virtual sensor, which may determine a condition directly and/or based on other data.

Figure 3:
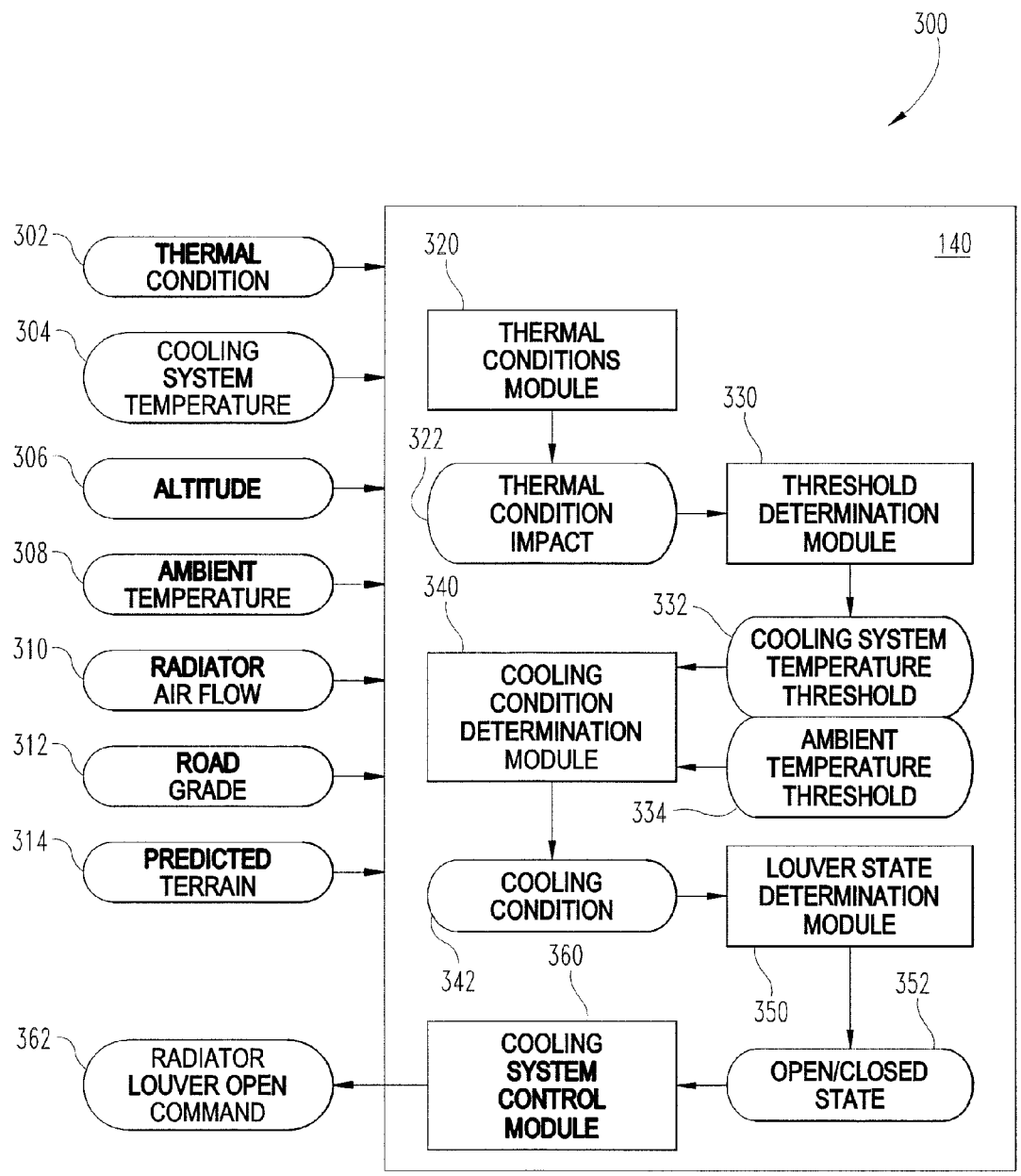
FIG. 3 is a diagram illustrating an embodiment of a controller apparatus for controlling one or more radiator louvers in the engine cooling system of FIG. 1.

With reference to FIG. 3, there is one non-limiting embodiment of an apparatus 300 including controller 140 for controlling one or more radiator louvers, such as the one or more radiator louvers 112 in the engine cooling system 106 illustrated in FIG. 1 during operation of a vehicle. In certain embodiments, the controller 140 includes a thermal condition input 302, a cooling system temperature input 304, an altitude input 306, an ambient temperature input 308, a radiator airflow input 310, a road grade input 312, and a predicted terrain input 314. It is contemplated that controller 140 inputs can come from sensors, virtual or real, and/or be calculated and/or estimated based on, for example, other sensors and/or engine operating conditions. It is further contemplated that the inputs described herein are exemplary only, and certain embodiments may contain fewer, additional and/or alternative inputs.

The thermal condition input 302 may include a weather condition, a frontward vehicle proximity condition, and/or an ambient temperature condition in which the vehicle is operated. In certain embodiments, the weather condition may include one or more of a direct sun condition, a humidity condition, a precipitation condition, a pressure condition such as a barometric pressure, a pollutant condition, a wind condition, and/or an elevation condition. The direct sun condition may be interpreted, for example, from a measurement or estimate, such as from a luminous intensity meter mounted on a vehicle, a voltage and/or current output level of a solar panel mounted on the vehicle, which may further indicate an intensity and direction of solar radiation and/or a cloud density indicating the direction of solar radiation is uncertain, a weather feed signal, such as from a broadcast service, a headlight sensor system of the vehicle, and/or a surface mounted thermal energy detection device, such as a shape memory alloy or surface mounted thermocouple on the vehicle. The precipitation condition may be interpreted from a measurement or estimate, such as from one or more optical cameras, a humidity sensor, a switch position of a windshield wiper switch, a weather feed signal, and/or the like. The wind condition may include determining a wind vector that may be interpreted from a measurement or estimate, such as from an ultrasonic wind sensor, a freewheeling rotational speed of a radiator fan, a wind speed sensor mounted on the vehicle, a weather feed signal, a difference between a predicted and actual engine load, and/or the like. The frontward vehicle proximity condition may include a vehicle platooning condition and/or a tailgating condition, each condition indicative of the spacing between two vehicles. The two vehicles in the frontward vehicle proximity condition include a frontward vehicle and a rearward vehicle, with embodiment 300 being in the rearward vehicle.

The cooling system temperature input 304 may include any input suitable to indicate a cooling system temperature, such as a temperature of an engine, a temperature of a coolant, and/or a temperature of a radiator fan. In certain embodiments, the altitude input 306 may be interpreted from an altimeter and/or a global positioning system (GPS) location signal. The radiator air flow input 310 may be interpreted from a measurement or estimate, such as from a mass air flow (MAF) sensor mounted to a grill of the vehicle, a freewheeling rotational speed of a radiator fan, a pitot tube sensor mounted to the grill of the vehicle, and/or a difference between the speed of the vehicle and a wind vector. The road grade input 312 and/or the predicted terrain input 314 may be interpreted from a measurement or estimate, such as from an inclinometer gauge, road grade data from a sensor, internal navigation units (e.g., gyroscopes, etc.), GPS coordinates, learned route information, a virtual road grade estimator, and/or any other road grade measurement/estimation method and/or tool known in the art.

Apparatus 300 further includes one or more of a thermal conditions module 320, a threshold determination module 330, a cooling condition determination module 340, a louver state determination module 350, and a cooling system control module 360. Other controller 140 arrangements that functionally execute the operations of the controller 140 are contemplated in the present application.

The thermal conditions module 320 is structured to receive and interpret one or more of inputs 302, 304, 306, 308, 310, 312, 314 to the controller 140. The thermal conditions module 320 is structured to determine a thermal condition impact 322 based on at least a portion of the inputs received by the thermal conditions module 320. In certain embodiments, the thermal condition impact 322 is based on effects the thermal conditions of the external environment of the vehicle have or are predicted to have on the engine cooling system 106. The thermal condition may include an insolation condition, a sun condition, a cloud condition, a humidity condition, a precipitation condition, an air pressure condition, a pollutant condition, a wind condition, a time of day, an elevation, and/or a proximity of a frontforward vehicle (platooning) condition associated with the external environment of the vehicle capable of being measured and for which a heat transfer effect (i.e. conduction, convection, radiation, etc.) on the vehicle can be determined.

The threshold determination module 330 is structured to receive and interpret the thermal condition impact 322 from the thermal conditions module 320. The threshold determination module 330 is further structured to determine a cooling system temperature threshold 332 and an ambient temperature threshold 334 in response to the thermal condition impact 322. The cooling system temperature threshold 332 and ambient temperature threshold 334 vary in response to the thermal condition impact 322 to optimize the opening of the radiator louvers to minimize the radiator fan on time while also avoiding the drag associated with opening the radiator louvers in conditions where open radiator louvers are not required to manage the coolant temperature. In certain embodiments, the cooling system temperature threshold 332 and ambient temperature threshold 334 may be further determined in response to one or more of the inputs to controller 140.

In certain embodiments, additional and/or alternative thresholds may be determined, such as a road grade threshold and/or a radiator airflow threshold, for example. In one example, the road grade threshold may be determined based on one or more of the thermal impact condition 322, the cooling system temperature 304, the altitude 306, and ambient temperature 308. In yet another example, the airflow threshold to the radiator may be determined based on one or more of the thermal impact condition 322, the cooling system temperature 304, altitude 306 and ambient temperature 308.

The cooling condition determination module 340 is structured to receive and interpret the cooling system temperature threshold 332 and ambient temperature threshold 334 from the threshold determination module 330. In certain embodiments, the cooling condition determination module 340 may be further structured to receive additional and/or alternative thresholds determined by the threshold determination module 340, such as the road grade threshold and radiator airflow threshold. The cooling condition determination module 340 is further structured to determine a cooling condition 342 in response to the cooling system temperature 304 exceeding the cooling system temperature threshold 332 and the ambient temperature 308 exceeding the ambient temperature threshold 334.

In certain embodiments, the temperature of the engine cooling system 106 may include a temperature of the engine 102, a temperature of a coolant in the engine cooling system 106, and/or a temperature of the radiator fan 118 of the engine cooling system. It is contemplated that in certain embodiments, the cooling condition 342 may be further based on one or more of the inputs to controller 140. In one alternative embodiment, the cooling condition 342 may be further based on the predicted terrain input 314 indicating a road grade greater than the road grade threshold. In another alternative embodiment, the cooling condition 342 may be further based on the airflow to the cooling system 106 being less than the radiator airflow threshold.

The louver state determination module 350 is structured to receive and interpret the cooling condition 342 from the cooling condition determination module 340. The louver state determination module 350 is further structured to determine an open/closed state 352 for the radiator louvers 112 based on the cooling condition 342. It is contemplated that in certain embodiments the open/closed state 352 determination may be further based on one or more of the inputs to controller 140, such as the radiator airflow 310, the road grade 312, and/or the predicted terrain 314, for example.

In certain embodiments, the louver state determination module 350 may be further structured to determine a drag increase of the vehicle system based on the open/closed state 352 for the radiator louvers 112, a fuel economy penalty based on the drag increase created by opening the radiator louvers 112, a cooling gain based on the open state of the radiator louvers 112, and an adjusted open/closed state for the radiator louvers 112 based on the fuel economy penalty being less than the cooling gain. In another embodiment, the louver state determination module 350 may be further structured to determine a fuel cost of turning on the radiator fan 118, a cooling gain based on the open/closed state 352 of the radiator louvers 112, and an adjusted open/closed state for the radiator louvers 112 based on the fuel cost being greater than the cooling gain so that the louvers 112 are opened, remain open, and/or having an open amount adjusted.

The cooling system control module 360 is structured to receive and interpret the open/closed stated 352 from the louver state determination module 350, or the adjusted open/closed state in an alternative embodiment. The cooling system control module 360 is further structured to provide a radiator louver open command 362 to at least one of the one or more of the radiator louvers 112, which include one or more actuators capable of receiving and interpreting the radiator louver open command 362 to open or close the radiator louvers, in response to the open/closed state 352, or the adjusted open/closed state in an alternative embodiment.

Figure 4:
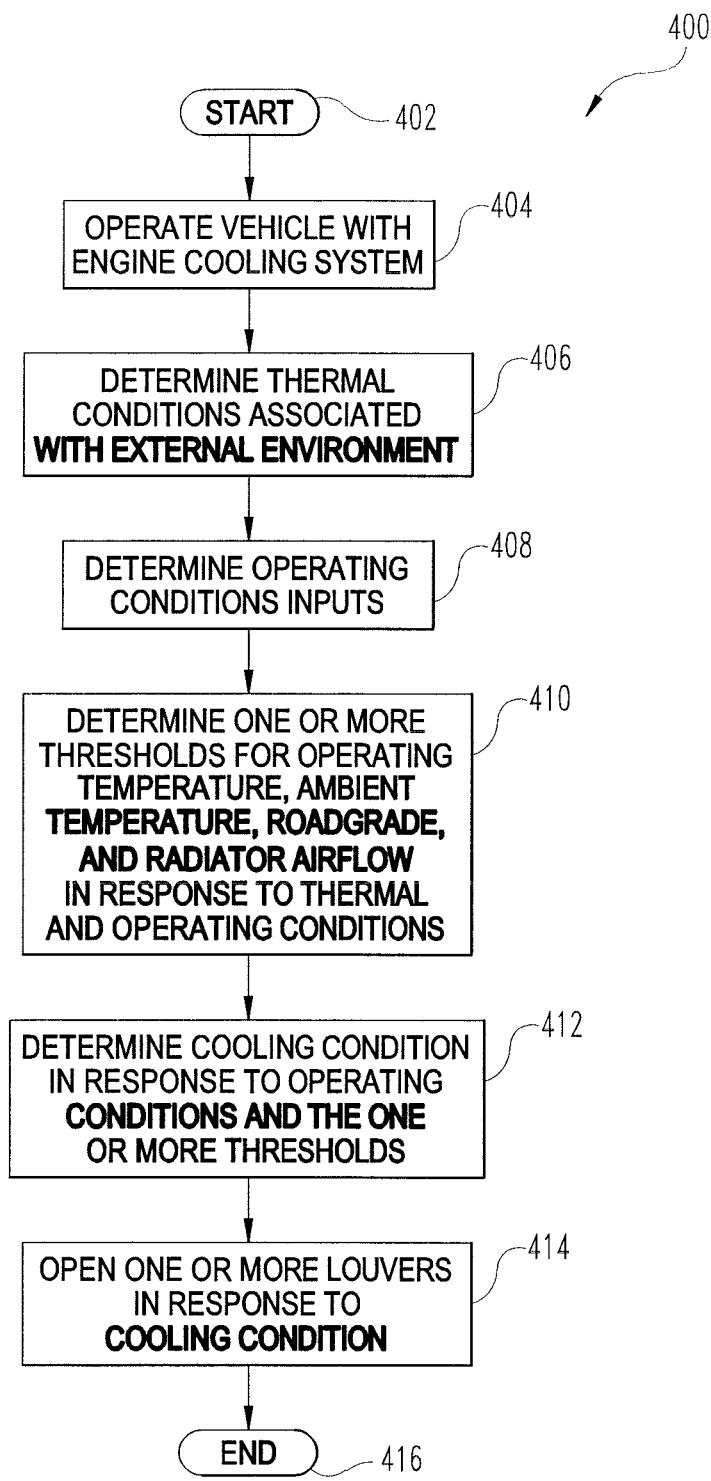
FIG. 4 is a flow diagram of a procedure that can be performed in conjunction with controlling one or more radiator louvers in the engine cooling system of FIG. 1.

Referencing FIG. 4, there is illustrated a schematic flow diagram of a procedure 400 for controlling radiator louvers in a vehicle, such as the one or more radiator louvers 112 in the engine cooling system 106 illustrated in FIG. 1. Operations illustrated are understood to be examples only, and operations may be combined or divided, and added or removed, as well as re-ordered in whole or in part, unless explicitly stated to the contrary.

Procedure 400 begins at start 402, which may begin by interpreting a key-on event and/or by initiation by a vehicle operator or technician. Start 402 may alternatively or additionally include interpreting a communication or other parameter indicating that operation of a sampling interval is going to restart procedure 400 upon completion of a previous iteration of procedure 400.

Procedure 400 continues from start 402 at operation 404, where the vehicle is operated with an engine cooling system, such as cooling system 106, to receive and reject heat from the engine to the atmosphere. Procedure 400 continues at operation 406 where thermal conditions associated with an external environment of the vehicle are determined. As discussed above, the thermal conditions can include, for example, a direct sun condition, a precipitation condition, a vehicle platooning condition, among others.

From operation 406 procedure 400 continues at operation 408 to determine operating condition inputs associated with the vehicle. The operating conditions inputs can include a temperature of the coolant or other component indicative of a temperature of the engine cooling system 106, an ambient temperature, and/or an altitude of the vehicle. Other inputs can include, for example, an airflow to the radiator, and/or a road grade, predicted or sensed, of a current road grade or an upcoming road grade. From operation 408, procedure 400 continues at operation 410 to determine one or more thresholds for the operating temperature and the ambient temperature in response to the thermal conditions. The one or more thresholds can further be determined in response to one or more operating conditions such as the ambient temperature, altitude, cooling system temperature, radiator airflow, and/or road grade. In certain embodiments, the thermal conditions may include a frontward vehicle proximity (platooning) condition and/or a weather condition. The weather condition may include a direct sun condition and/or a precipitation condition, for example.

Procedure 400 continues from operation 410 at operation 412 to determine a cooling condition in which increased airflow to the radiator from opening louvers 112 is desired in response to the operating conditions and the one or more thresholds to avoid or delay operating radiator fan 118. For example, a cooling condition can be indicated in response to the cooling system operating temperature exceeding the operating temperature threshold and the ambient temperature exceeding the ambient temperature threshold. In further embodiments, a cooling condition is determined in response to an airflow to the radiator 110 being less than the radiator airflow threshold, and/or a predicted or current road grade being greater than the road grade threshold. In certain embodiments, the operating temperature threshold and/or the ambient temperature threshold vary depending on the altitude, the airflow to the radiator, and/or the road grade. In another embodiment, the method includes derating the engine to increase a separation distance of the vehicle from a frontward vehicle in response to the thermal condition indicating a platooning condition.

From operation 412, procedure 400 continues at operation 414 where it is determined to open one or more louvers in response to the cooling condition. Opening the one or more louvers can include any one or combination of opening one or more louvers from a closed state, maintaining one or more open louvers in an open state, and/or adjusting an opening amount of one or more louvers. From operation 414, procedure 400 ends at 416. It is contemplated that in certain embodiments procedure 400 may be automatically repeated (i.e. restarts at operation 402) at a next control sampling time when procedure 400 ends.

Various aspects of the systems, apparatus, and methods are disclosed herein. For example, one aspect involves a method including operating a vehicle including an engine with an engine cooling system for circulating a coolant, the engine cooling system including a radiator, a radiator fan, and one or more louvers associated with the radiator; determining a thermal condition associated with an external environment of the vehicle, an operating temperature associated with operation of the engine, and an ambient temperature associated with the external environment; in response to the thermal condition, determining a first temperature threshold associated with the operating temperature and a second temperature threshold associated with the ambient temperature; determining a cooling condition for the coolant in response to the operating temperature being greater than the first temperature threshold and the ambient temperature being greater than the second temperature threshold; and opening one or more louvers associated with the engine cooling system in response to the cooling condition.

In one embodiment, the operating temperature comprises a temperature of the coolant in the engine cooling system. In another embodiment, the method includes determining the first temperature threshold and the second temperature threshold in response to an altitude of the vehicle.

In another embodiment, the thermal condition includes at least one of a weather condition and a vehicle platooning condition. In a refinement of this embodiment, the method includes derating the engine in response to the vehicle platooning condition to increase a separation distance with a frontward vehicle. In another refinement, the weather condition includes one of a direct sun condition and a precipitation condition.

In another embodiment, the method includes determining a road grade threshold and an airflow threshold for an airflow to the radiator in response to the thermal condition; determining at least one of a road grade is greater than the road grade threshold and the airflow is less than the airflow threshold; and opening the one or more louvers in response to determining the at least one of the road grade is greater than the road grade threshold and the airflow is less than the airflow threshold.

In yet another embodiment, the method includes determining a road grade threshold in response to the thermal condition; determining a road grade is greater than the road grade threshold; and opening the one or more louvers in response to the road grade being greater than the road grade threshold. In a refinement of this embodiment, determining the road grade threshold includes determining a length of the road grade. In another refinement of this embodiment, the method includes determining an airflow threshold for an airflow to the radiator in response to the thermal condition and opening the one or more louvers in response to the airflow to the radiator being less than the airflow threshold. In yet another refinement of this embodiment, determining the road grade includes sensing the road grade with a sensor on the vehicle. In another refinement, determining the road grade includes predicting the road grade.

In another embodiment, the method includes determining an airflow threshold for an airflow to the radiator in response to the thermal condition and opening the one or more louvers in response to the airflow to the radiator being less than the airflow threshold.

According to another aspect, a method includes determining a thermal condition associated with at least one of a direct sun condition, a vehicle platooning condition, and a precipitation condition associated with an external environment condition of a vehicle including an engine, an engine cooling system, and at least one louver associated with the engine cooling system; determining a first temperature threshold of the engine cooling system and a second temperature threshold associated with an ambient temperature in response to the thermal condition; determining a cooling condition in response to a temperature of the engine cooling system being greater than the first temperature threshold and an ambient temperature being greater than the second threshold; and opening the at least one louver associated with the cooling system in response to the cooling condition.

In another embodiment, the method includes determining a road grade threshold in response to the thermal condition and opening the at least one louver is further in response to a road grade being greater than the road grade threshold. In a refinement of this embodiment, determining the road grade threshold includes determining a length of the road grade.

In another embodiment, the method includes determining an airflow threshold for an airflow to the cooling system in response to the thermal condition; determining an airflow to the cooling system; and opening the at least one louver is further in response to the airflow to the cooling system being less than the airflow threshold.

In yet another embodiment, the first threshold and the second threshold are based at least in part on an altitude of the vehicle. In another embodiment, the temperature of the engine cooling system includes at least one of a temperature of the engine, a temperature of a coolant in the engine cooling system, and a temperature of a radiator fan of the engine cooling system.

According to another aspect, a system includes a vehicle including an engine and a cooling system in fluid communication with the engine. The cooling system including one or more radiator louvers to direct a heat transfer from a coolant in the cooling system to an external environment of the vehicle. The system also includes a plurality of sensors operable to provide a plurality of inputs associated with operating conditions of the vehicle, the plurality of inputs including at least a temperature of the cooling system, an ambient temperature, and a thermal condition associated with the vehicle. The system also includes an electronic controller in operative communication with the engine, the cooling system, and the plurality of sensors. The electronic controller includes a thermal conditions module structured to determine a thermal condition associated with the vehicle in response to at least a portion of the plurality of inputs, a threshold determination module structured to determine a cooling system temperature threshold and an ambient temperature threshold in response to the condition, a cooling condition determination module structured to determine a cooling condition for the cooling system in response to the temperature of the cooling system exceeding the cooling system temperature threshold and the ambient temperature exceeding the ambient temperature threshold, and a cooling system control module structured to provide a radiator louver open command to at least one of the one or more radiator louvers in response to the cooling condition.

In one embodiment, the cooling system further includes a pump operable to direct a flow of a cooling fluid through a coolant flow path, a radiator operable to exchange engine heat from the engine cooling fluid to ambient air, and a radiator fan operable to circulate an airflow to the cooling system. In another embodiment, the thermal condition includes at least one of a direct sun condition, a precipitation condition, and a vehicle platooning condition. In yet another embodiment, the thermal condition includes at least one of an insolation condition, a sun condition, a cloud condition, a humidity condition, a precipitation condition, an air pressure condition, a pollutant condition, a wind condition, a time of day, and an altitude.

In another embodiment, the threshold determination module is further structured to determine an airflow threshold for an airflow to the cooling system in response to the thermal condition, and the cooling condition determination module is structured to determine the cooling condition in response to the airflow to the cooling system being less than the airflow threshold. In a refinement of this embodiment, the threshold determination module is further structured to determine a road grade threshold in response to the thermal condition, and the cooling condition determination module is further structured to determine the cooling condition in response to a road grade being greater than the road grade threshold.

In another embodiment, the threshold determination module is further structured to determine a road grade threshold in response to the thermal condition, and the cooling condition determination module is further structured to determine the cooling condition in response to a road grade being greater than the road grade threshold. In a refinement of this embodiment, the threshold determining module is further structured to determine the road grade threshold in response to a length of the road grade.

In another embodiment, the plurality of inputs includes a direct sun condition, and the thermal condition is determined in response to the direct sun condition. In yet another embodiment, the plurality of inputs includes a precipitation condition, and the thermal condition is determined in response to the precipitation condition. In yet another embodiment, the plurality of inputs includes a vehicle platooning condition, and the thermal condition is determined in response to the vehicle platooning condition.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating a vehicle including an engine with an engine cooling system for circulating a coolant, the engine cooling system including a radiator, a radiator fan, and one or more louvers associated with the radiator;
   determining a thermal condition associated with an external environment of the vehicle, an operating temperature associated with operation of the engine, and an ambient temperature associated with the external environment;
   in response to the thermal condition, determining a first temperature threshold associated with the operating temperature and a second temperature threshold associated with the ambient temperature;
   determining a cooling condition for the coolant in response to the operating temperature being greater than the first temperature threshold and the ambient temperature being greater than the second temperature threshold; and
   opening one or more louvers associated with the engine cooling system in response to the cooling condition.

2. The method of claim 1, wherein the operating temperature comprises a temperature of the coolant in the engine cooling system.

3. The method of claim 1, further comprising determining the first temperature threshold and the second temperature threshold in response to an altitude of the vehicle.

4. The method of claim 1, wherein the thermal condition includes at least one of a weather condition and a vehicle platooning condition.

5. The method of claim 4, further comprising derating the engine in response to the vehicle platooning condition to increase a separation distance with a frontward vehicle.

6. The method of claim 4, wherein the weather condition includes one of a direct sun condition and a precipitation condition.

7. The method of claim 1, further comprising:
   determining a road grade threshold and an airflow threshold for an airflow to the radiator in response to the thermal condition;
   determining at least one of a road grade is greater than the road grade threshold and the airflow is less than the airflow threshold; and
   opening the one or more louvers in response to determining the at least one of the road grade is greater than the road grade threshold and the airflow is less than the airflow threshold.

8. The method of claim 1, further comprising:
   determining a road grade threshold in response to the thermal condition;
   determining a road grade is greater than the road grade threshold; and
   opening the one or more louvers in response to the road grade being greater than the road grade threshold.

9. The method of claim 8, wherein determining the road grade threshold includes determining a length of the road grade.

10. The method of claim 8, further comprising:
    determining an airflow threshold for an airflow to the radiator in response to the thermal condition; and
    opening the one or more louvers in response to the airflow to the radiator being less than the airflow threshold.

11. The method of claim 8, wherein determining the road grade includes sensing the road grade with a sensor on the vehicle.

12. The method of claim 8, wherein determining the road grade includes predicting the road grade.

13. The method of claim 1, further comprising:
    determining an airflow threshold for an airflow to the radiator in response to the thermal condition; and
    opening the one or more louvers in response to the airflow to the radiator being less than the airflow threshold.

14. A method, comprising:
    determining a thermal condition including at least one of a direct sun condition, a vehicle platooning condition, and a precipitation condition associated with an external environment condition of a vehicle including an engine, an engine cooling system, and at least one louver associated with the engine cooling system;
    determining a first temperature threshold of the engine cooling system and a second temperature threshold associated with an ambient temperature in response to the thermal condition;
    determining a cooling condition in response to a temperature of the engine cooling system being greater than the first temperature threshold and an ambient temperature being greater than the second threshold; and
    opening the at least one louver associated with the cooling system in response to the cooling condition.

15. The method of claim 14, further comprising:
    determining a road grade threshold in response to the thermal condition, wherein opening the at least one louver is further in response to a road grade being greater than the road grade threshold.

16. The method of claim 15, wherein determining the road grade threshold includes determining a length of the road grade.

17. The method of claim 14, further comprising:
    determining an airflow threshold for an airflow to the cooling system in response to the thermal condition;
    determining an airflow to the cooling system; and
    wherein opening the at least one louver is further in response to the airflow to the cooling system being less than the airflow threshold.

18. The method of claim 14, wherein the first threshold and the second threshold are based at least in part on an altitude of the vehicle.

19. The method of claim 14, wherein the temperature of the engine cooling system includes at least one of a temperature of the engine, a temperature of a coolant in the engine cooling system, and a temperature of a radiator fan of the engine cooling system.

20. A system, comprising:
a vehicle including an engine;
a cooling system in fluid communication with the engine, the cooling system including one or more radiator louvers to direct a heat transfer from a coolant in the cooling system to an external environment of the vehicle;
a plurality of sensors operable to provide a plurality of inputs associated with operating conditions of the vehicle, the plurality of inputs including at least a temperature of the cooling system, an ambient temperature, and a thermal condition associated with the vehicle;
an electronic controller in operative communication with the engine, the cooling system, and the plurality of sensors, wherein the electronic controller includes:
a thermal conditions module structured to determine the thermal condition associated with the vehicle in response to at least a portion of the plurality of inputs;
a threshold determination module structured to determine a cooling system temperature threshold and an ambient temperature threshold in response to the thermal condition;
a cooling condition determination module structured to determine a cooling condition for the cooling system in response to the temperature of the cooling system exceeding the cooling system temperature threshold and the ambient temperature exceeding the ambient temperature threshold; and
a cooling system control module structured to provide a radiator louver open command to at least one of the one or more radiator louvers in response to the cooling condition.

21. The system of claim 20, wherein the cooling system further includes a pump operable to direct a flow of a cooling fluid through a coolant flow path, a radiator operable to exchange engine heat from the engine cooling fluid to ambient air, and a radiator fan operable to circulate an airflow to the cooling system.

22. The system of claim 20, wherein the thermal condition includes at least one of a direct sun condition, a precipitation condition, and a vehicle platooning condition.

23. The system of claim 20, wherein the thermal condition includes at least one of an insolation condition, a sun condition, a cloud condition, a humidity condition, a precipitation condition, an air pressure condition, a pollutant condition, a wind condition, a time of day, and an altitude.

24. The system of claim 20, wherein the threshold determination module is further structured to determine an airflow threshold for an airflow to the cooling system in response to the thermal condition, and the cooling condition determination module is structured to determine the cooling condition in response to the airflow to the cooling system being less than the airflow threshold.

25. The system of claim 24, wherein the threshold determination module is further structured to determine a road grade threshold in response to the thermal condition, and the cooling condition determination module is further structured to determine the cooling condition in response to a road grade being greater than the road grade threshold.

26. The system of claim 20, wherein the threshold determination module is further structured to determine a road grade threshold in response to the thermal condition, and the cooling condition determination module is further structured to determine the cooling condition in response to a road grade being greater than the road grade threshold.

27. The system of claim 26, wherein the threshold determining module is further structured to determine the road grade threshold in response to a length of the road grade.

28. The system of claim 20, wherein the plurality of inputs includes a direct sun condition, and the thermal condition is determined in response to the direct sun condition.

29. The system of claim 20, wherein the plurality of inputs includes a precipitation condition, and the thermal condition is determined in response to the precipitation condition.

30. The system of claim 20, wherein the plurality of inputs includes a vehicle platooning condition, and the thermal condition is determined in response to the vehicle platooning condition.

* * * * *